(12) United States Patent
Zhang

(10) Patent No.: US 10,989,260 B2
(45) Date of Patent: Apr. 27, 2021

(54) AIR COOLING OF DISC BRAKE UNIT BY LONGITUDINAL VORTEX GENERATOR

(71) Applicant: Ming Zhang, Montreal (CA)

(72) Inventor: Ming Zhang, Montreal (CA)

( * ) Notice: Subject to any disclaimer, the term of this patent is extended or adjusted under 35 U.S.C. 154(b) by 0 days.

(21) Appl. No.: 16/350,764

(22) Filed: Jan. 3, 2019

(65) Prior Publication Data

US 2020/0217378 A1   Jul. 9, 2020

(51) Int. Cl.
*F16D 65/847* (2006.01)
*F16D 65/12* (2006.01)
*F16D 65/02* (2006.01)

(52) U.S. Cl.
CPC ......... *F16D 65/128* (2013.01); *F16D 65/124* (2013.01); *F16D 65/847* (2013.01); *F16D 2065/1312* (2013.01); *F16D 2065/1316* (2013.01); *F16D 2065/1328* (2013.01)

(58) Field of Classification Search
CPC .... F16D 65/128; F16D 65/124; F16D 65/847; F16D 2065/1312; F16D 2065/1328; F16D 2065/1316
See application file for complete search history.

(56) References Cited

U.S. PATENT DOCUMENTS

| 2,199,785 | A | * | 5/1940 | Dickson | F16D 55/06 188/366 |
| 4,164,993 | A | * | 8/1979 | Kobelt | F16D 65/128 188/218 XL |
| 7,111,710 | B2 | * | 9/2006 | O'Rourke | F16D 65/0037 188/218 XL |
| 9,022,182 | B2 | * | 5/2015 | Cavagna | F16D 65/128 188/218 XL |
| 9,033,118 | B2 | | 5/2015 | Lee | |
| 9,080,625 | B2 | * | 7/2015 | Oberti | F16D 65/128 |
| 9,587,690 | B2 | | 3/2017 | Bofelli | |
| 10,071,595 | B2 | | 9/2018 | Hasegawa | |
| 2019/0063526 | A1 | * | 2/2019 | Biondo | F16D 65/128 |
| 2019/0353216 | A1 | * | 11/2019 | Ronchi | F16D 65/128 |

* cited by examiner

*Primary Examiner* — Michael C Zarroli

(57) ABSTRACT

A vehicle disc brake unit comprises a rotatable brake rotor and non-rotatable brake pad of caliper. During the vehicle braking, the non-rotatable brake pad presses against the rotating brake rotor, producing friction heat on frictional contact bands where the brake rotor and the brake pad engages with each other. A plurality of longitudinal vortex generators configured in fins is mounted either to a rotatable vehicle component such as hat of a brake rotor, or a non-rotatable vehicle component such as a protective plate, generating longitudinal vortices in the cooling air flows around the brake rotor, especially across the hottest frictional contact bands. The induced longitudinal vortices in the cooling air flows optimize the heat dissipation from brake rotor into atmosphere.

16 Claims, 14 Drawing Sheets

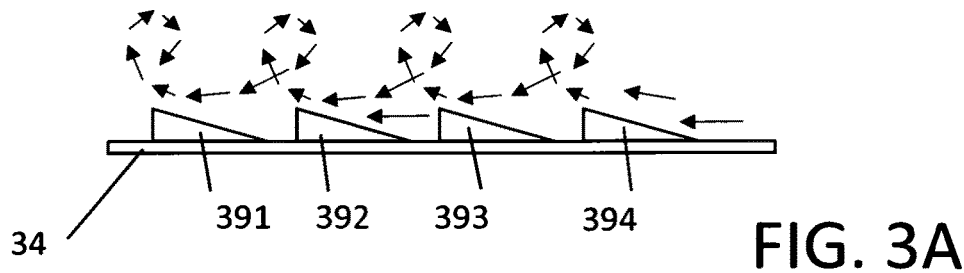
FIG. 3A
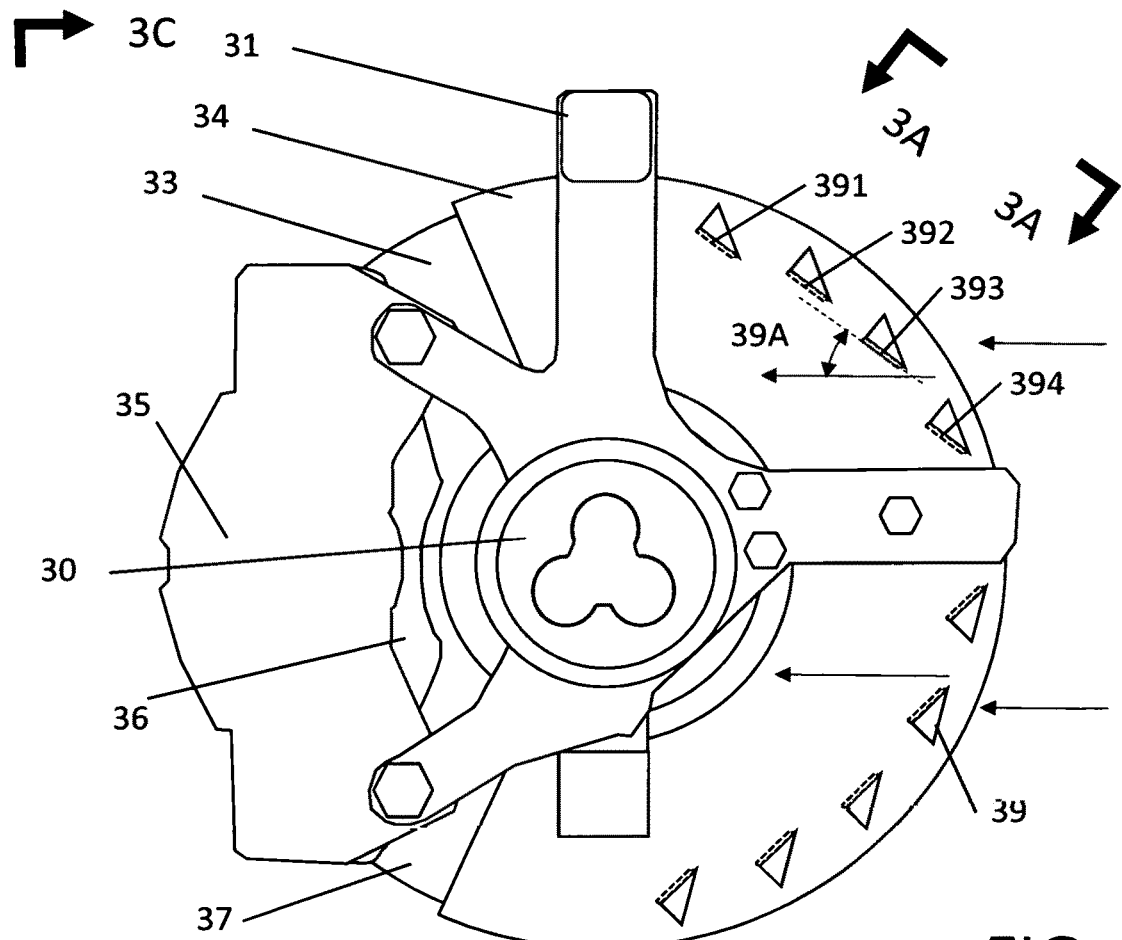
FIG. 3

AIR COOLING OF DISC BRAKE UNIT BY LONGITUDINAL VORTEX GENERATOR

CROSS-REFERENCE TO RELATED APPLICATIONS

None

FIELD OF THE INVENTION

The present invention relates mainly to a disc brake unit for road vehicles and railway vehicles.

BACKGROUND OF THE INVENTION

Disc brake unit are employed widely to slow down and stop road and railway vehicles. During braking application, disc brake unit transforms kinetic energy into heat by means of friction between a rotatable brake rotor and a non-rotatable pad of caliper, both coupled to the moving vehicle. When the brake rotor and the brake pad are heated due to braking, it should be cooled down as fast as possible to keep brake rotor and brake pad operating at relatively low temperatures to avoid overheating related brake rotor and brake pad failures, especially on the frictional contact bands where the brake rotor and the brake pad engage with each other.

Convective air cooling contributes to the majority of the heat dissipation from a vehicle disc brake unit during brake application. The efficiency of such air cooling, a kind of forced convective heat transfer, is measured by dissipated heat flux from the brake rotor and the brake pad, depends on their surface temperature differences relative to atmosphere, their surface areas, mass flow rates of the forced cooling air surrounding those surfaces, and forced convective heat transfer coefficient of those surfaces.

Among all the surfaces of brake rotor and brake pad, the frictional contact bands, where brake rotor and brake pad engage with each other, play an important role in such convective air cooling, due to their high surface temperatures and large surface areas, especially for the vehicles that are equipped with only solid brake rotors.

From U.S. Pat. Nos. 10,071,595B2, 9,033,118B2, and 9,587,690B2, efficient cooling of either a road vehicle disc brake unit or a railway vehicle disc brake unit, meanwhile keeping the air resistance and mass of the vehicle low, remains a constant challenge. Improved air cooling can make a significant contribution to good performance of the disc brake unit and prolong its service lives of their components by reducing brake rotor operating temperatures.

SUMMARY OF THE INVENTION

The purpose of the present invention is to provide a vehicle disc brake unit with improved heat dissipation capacity that allows the brake rotor operating at reduced temperatures, without adding significant mass to the disc brake unit.

To attain the above-mentioned object, the present invention is characterized by equipping disc brake unit with longitudinal vortex generator that generates longitudinal vortices in the cooling air flows before those air flows pass across the frictional contact bands on the surface of the brake rotor, promoting heat dissipation from the brake rotor.

BRIEF DESCRIPTION OF THE DRAWINGS

Other uses and advantages of the present invention will become apparent to those skilled in the art upon reference to the specification and the drawings, in which:

FIG. 3 is a partial inboard side view of a road vehicle disc brake unit to which a longitudinal vortex generator is mounted to the protective plate according to an alternative embodiment of the present invention;

FIG. 3A is an enlarged partial angled top view of the alternative embodiment of the present invention shown in FIG. 3, giving details of arrangement of longitudinal vortex generators mounted to the protective plate, also included are schematic views of swirling secondary cooling air flows, represented by arrows icons, induced by the longitudinal vortex generator;

DESCRIPTION OF THE PREFERRED EMBODIMENTS

Figure 1:
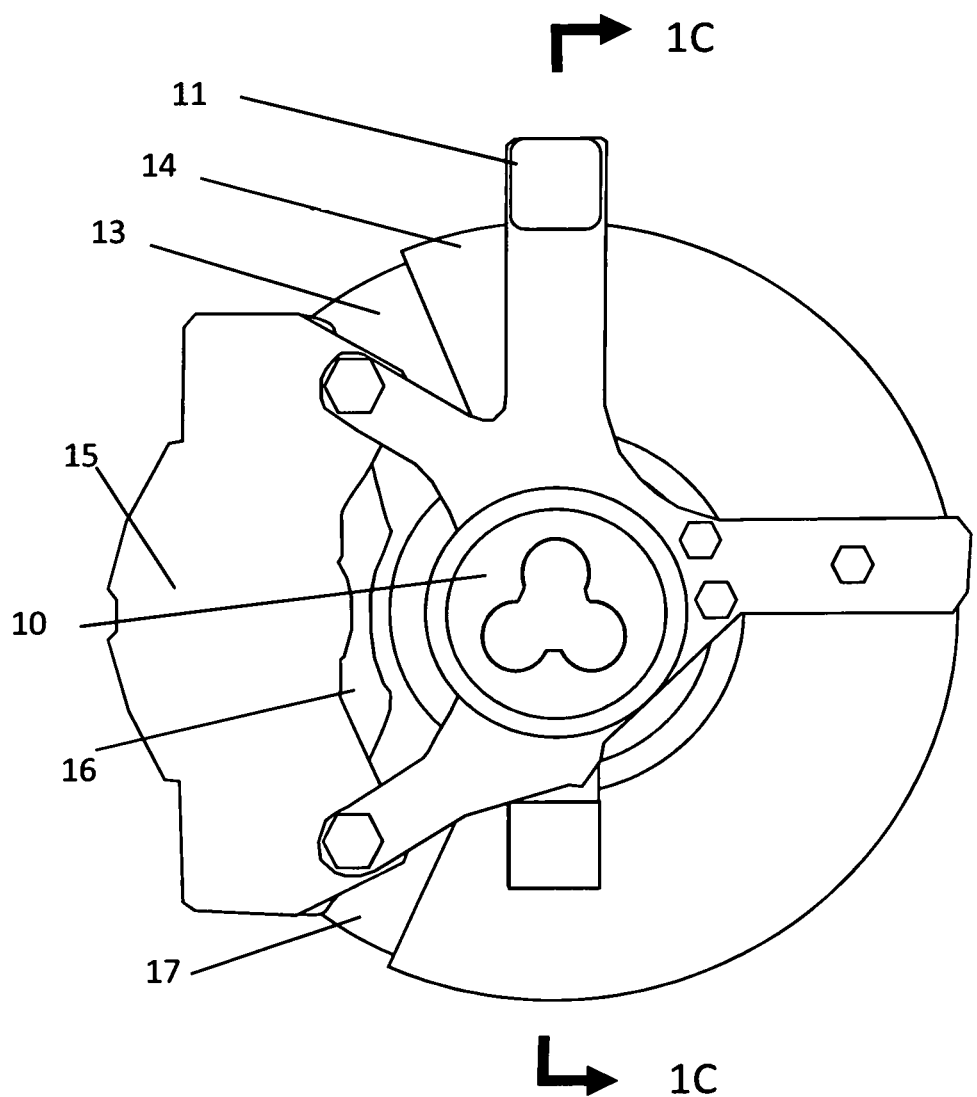
FIG. 1 is a partial inboard side view of a conventional road vehicle disc brake unit with a solid brake rotor, and a protective plate coupled to a brake knuckle of the vehicle.
Figure 1B:
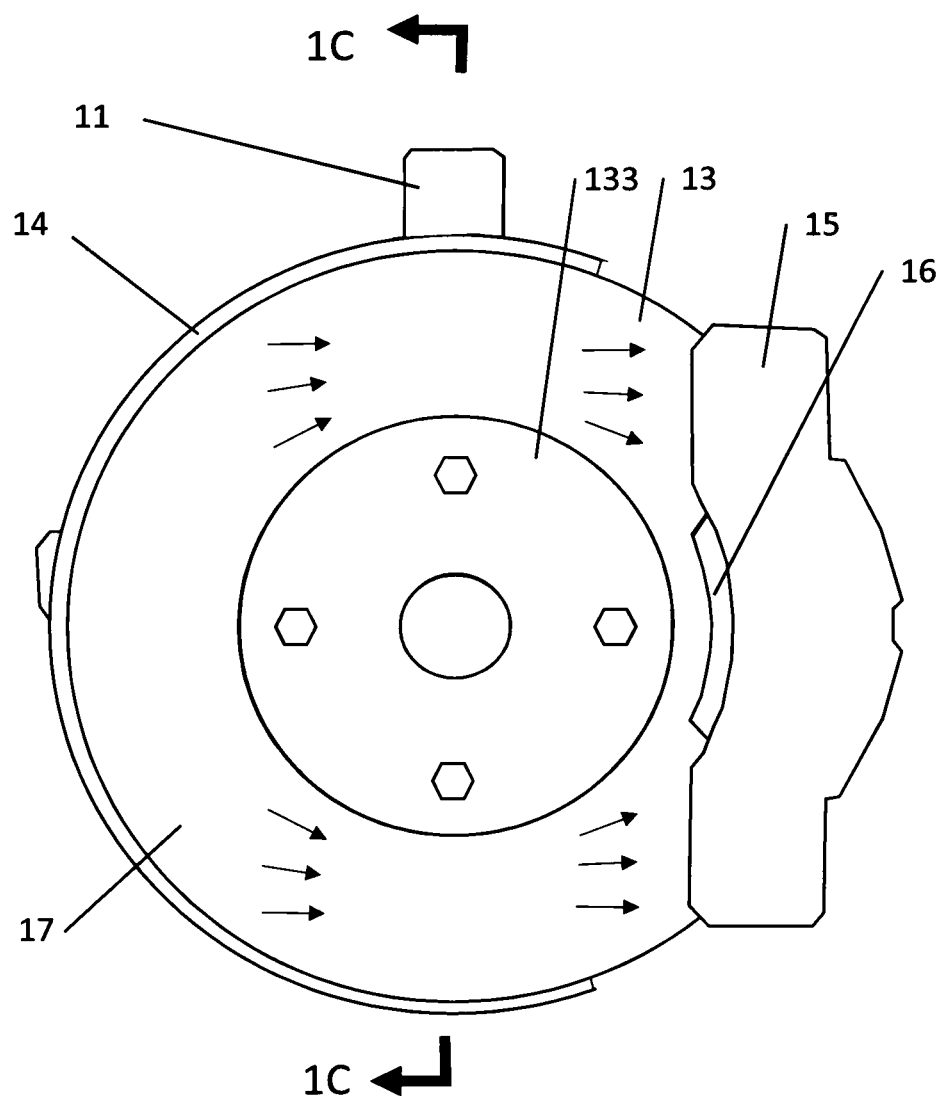
FIG. 1B is a partial outboard side view of the conventional road vehicle disc brake unit shown in FIG. 1, also included are schematic views of primary cooling air flows surrounding the moving vehicle represented by arrows icons.
Figure 1C:
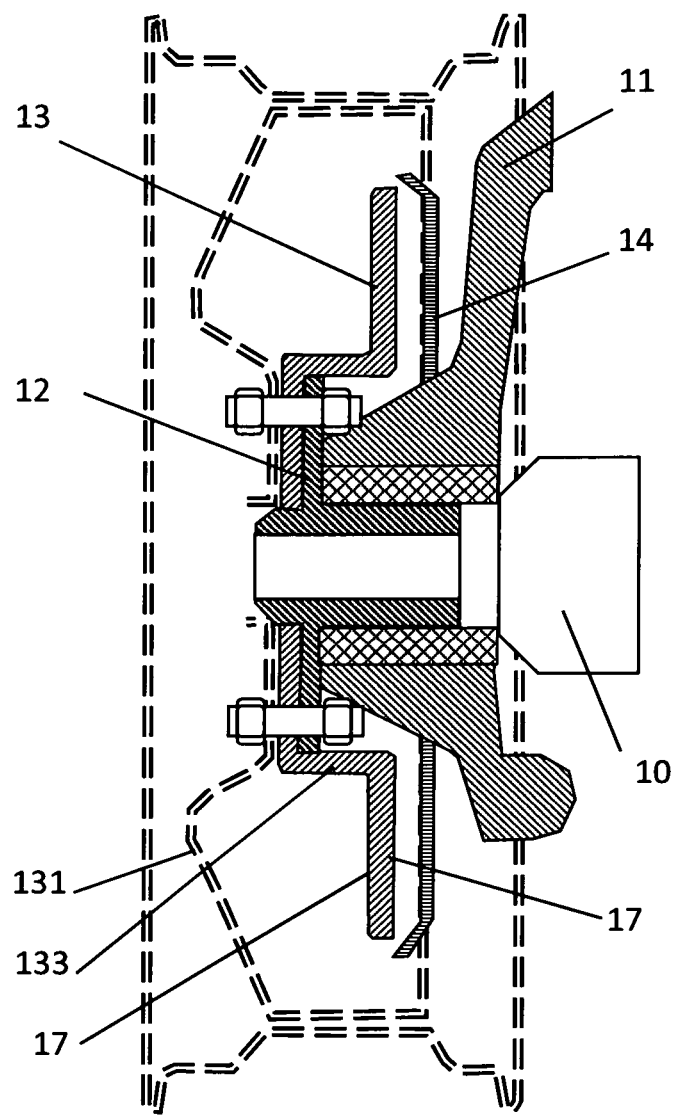
FIG. 1C is a partial cross-sectional view of the conventional road vehicle disc brake unit shown in FIG. 1, also included is a wheel rim profile in dotted lines.

FIG. 1, FIG. 1B and FIG. 1C show relevant components of a conventional road vehicle disc brake unit for a front left wheel.

A friction brake system includes two essential elements: a rotatable brake rotor 13 and a non-rotatable friction member called brake pad 16. A steering knuckle 11 with a brake caliper 15 are secured to the vehicle and together act as a friction member support. The steering knuckle 11, usually made in steel or aluminum alloys, structurally supports the non-rotatable brake pad 16 through the brake caliper 15. Meanwhile, the knuckle 11 supports the rotatable brake rotor 13 through a wheel hub 12, axle 10 as well as sets of roller bearing (not shown). The section 133 is referred by the industry as hat of the brake rotor and can be made either together with the brake rotor in the same material or as a separate component in different material. A protective plate 14, usually made in aluminum is also attached to the knuckle 11.

During road vehicle braking, a pair of non-rotatable brake pad 16 presses against rotatable brake rotor 13 to exert a friction force to decelerate and stop the vehicle, leaving a pair of annular frictional contact bands 17 on both sides of the friction ring of the brake rotor 13. The protective plate 14 protects the components of the disc brake system from dirt and debris.

Arrow icons in FIG. 1B gives schematic view of primary air flows passing across the frictional contact bands 17 for a moving vehicle. Those air flows travel generally in parallel to the frictional contact bands 17, especially in the areas in close proximity to the friction ring of the brake rotor.

The dotted line in FIG. 1C provides a schematic view of a wheel rim 131 surrounding the brake rotor 13. It helps appreciate the tight space available around the vehicle disc brake rotor 13.

FIG. 2, FIG. 2A, FIG. 2B, FIG. 2C and FIG. 2D depict one embodiment of the present invention. In addition to the road vehicle disc brake unit, identical to the unit shown in FIG. 1, two longitudinal vortex generators 28 and 29 are provided. A steering knuckle 21 with a brake caliper 25 are secured to the vehicle and together act as a friction member support. The steering knuckle 21, usually made in steel or aluminum alloys, structurally supports the non-rotatable brake pad 26 through the brake caliper 25. Meanwhile, the knuckle 21 supports the rotatable brake rotor 23. The section 233 is referred by the industry as hat of the brake rotor and can be made either together with the brake rotor in the same material or as a separate component in different material. A protective plate 24, usually made in aluminum is also attached to the knuckle 21.

Figure 2A:
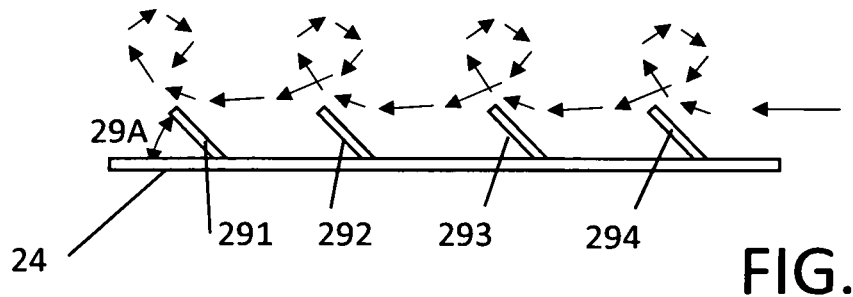
FIG. 2A is an enlarged partial top view of the road vehicle disc brake unit shown in FIG. 2, providing details of the arrangement of the longitudinal vortex generator mounted to the protective plate, also included are schematic views of swirling secondary cooling air flows induced by the longitudinal vortex generator, represented by arrows icons.
Figure 2:
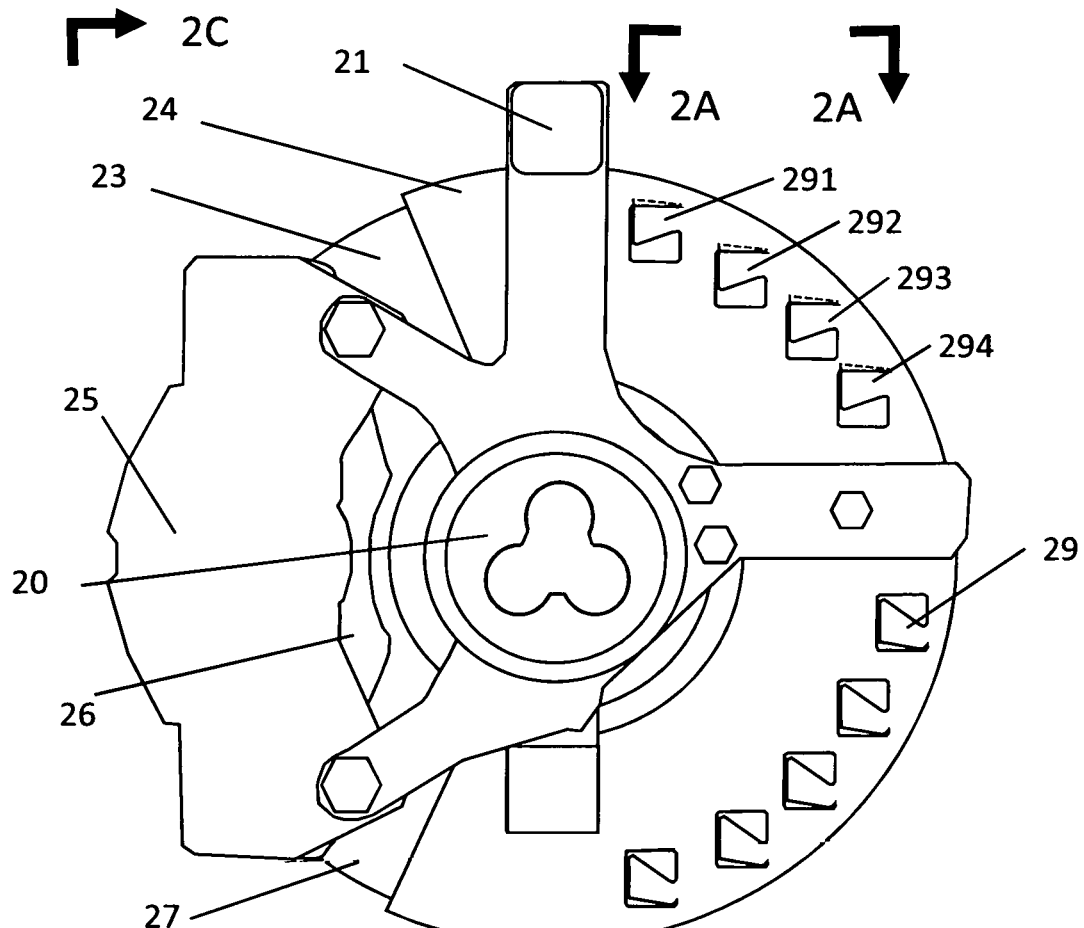
FIG. 2 is a partial inboard side view of a road vehicle disc brake unit to which longitudinal vortex generators are mounted to both hat of the brake rotor, a rotatable component of the disc brake unit, and protective plate, a non-rotatable component of the disc brake unit, according to an embodiment of the present invention.

As shown in FIGS. 2 and 2A, a longitudinal vortex generator 29 configured in form of a plurality of fins, for example, the fin 291, 292, 293 and 294, is mounted to the protective plate 24 made in metal sheet. The fins of the longitudinal vortex generator 29 are formed from the protective plate 24 by stamping process, with aid of die and tool.

As shown in FIG. 2A, the fin 291, 292, 293 and 294 of the longitudinal vortex generator 29 are all punched out from the left side and bent around a vertical line at right side, so that each fin extends from the protective plate 24 and takes an acute angle 29A of less than 85 degree relative to the primary air flow direction represented by the first arrow icon at the extreme right.

Figure 2B:
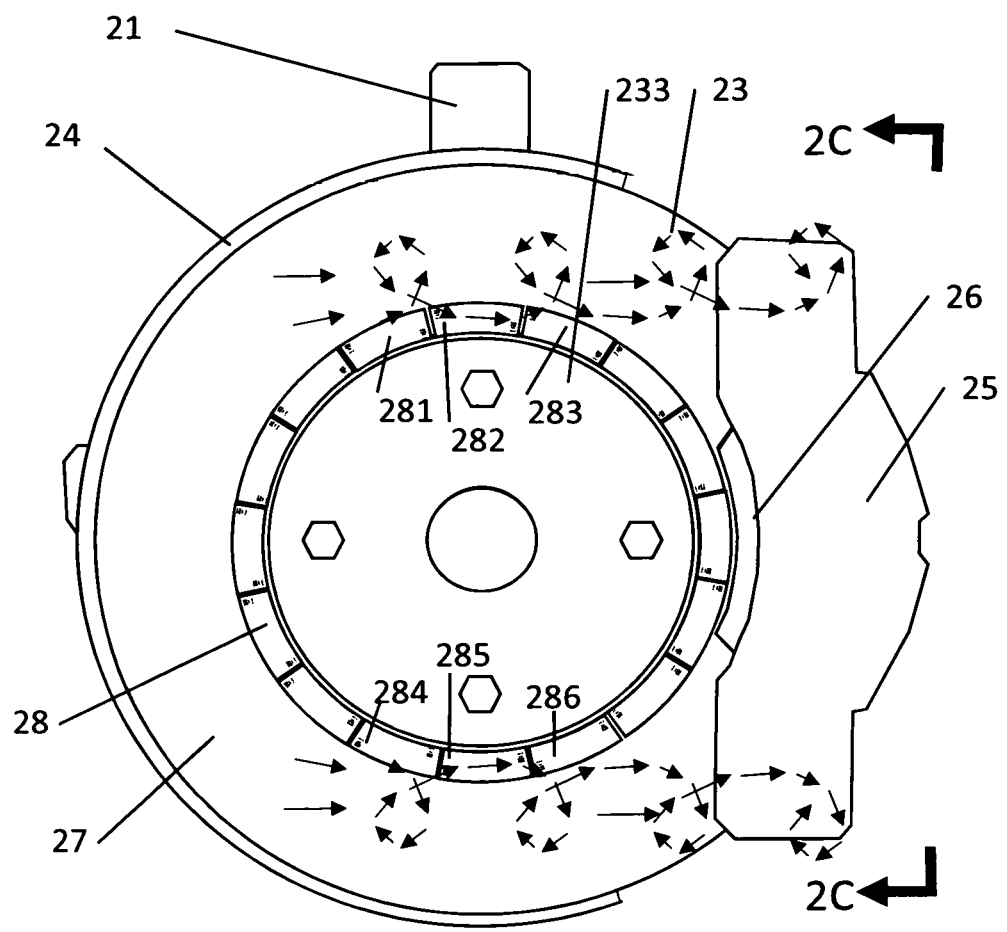
FIG. 2B is a partial outboard side view of the road vehicle disc brake unit shown in FIG. 2, also included are schematic views of swirling secondary cooling air flows induced by the longitudinal vortex generator, represented by arrows icons.
Figure 2C:
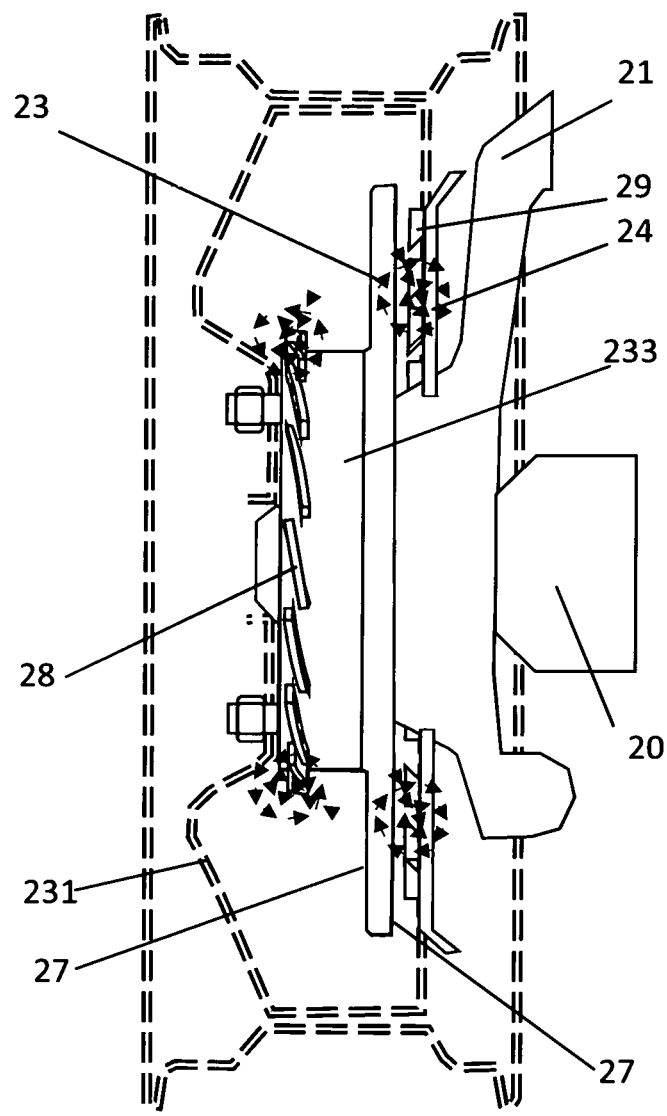
FIG. 2C is a partial perspective view of the road vehicle disc brake unit shown in FIG. 2, without showing the brake caliper and the brake pad, also included are schematic views of swirling secondary cooling air flows induced by the longitudinal vortex generator, represented by arrows icons.
Figure 2D:
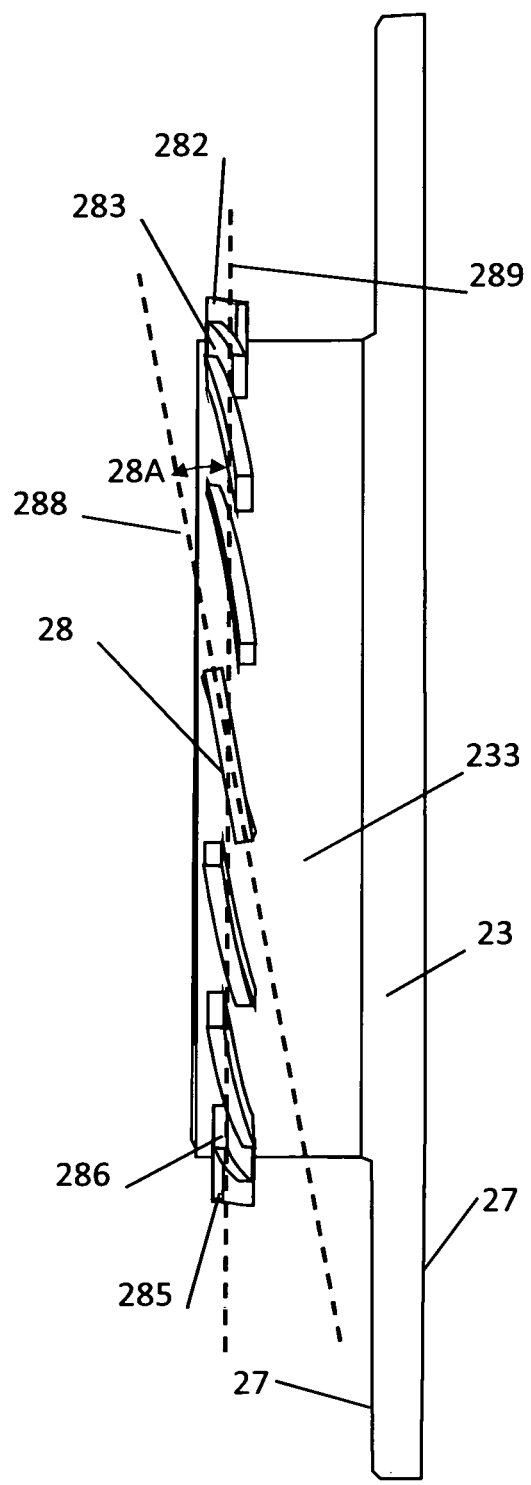
FIG. 2D is an enlarged view of the longitudinal vortex generator mounted to the hat of the brake rotor shown in FIG. 2.

As shown in FIG. 2B, FIG. 2C and FIG. 2D, a longitudinal vortex generator 28 is mounted to the rotatable brake rotor 23. The integrated brake rotor 23 comprises a friction ring and a hat 233. The longitudinal vortex generator 28 configured in a plurality of fins, for example the fin 281, 282, 283, 284, 285 and 286, being evenly distributed on a cylindrical surface of the hat 233 of the brake rotor 23.

As shown in FIG. 2D, each fin of the longitudinal vortex generator 28 extends within a reference plane 288 represented in dash line that takes an acute angle 28A against radial plane 289 represented by another dash line which is parallel to the frictional contact bands 27.

The tins of the longitudinal vortex generator 28 are manufactured by casting, forging or other suitable manufacturing method, and produced out of the same material, for example, vermicular graphite cast iron or spheroidal graphite cast iron. In the case where the friction ring and the hat of the brake rotor are produced separately as individual component, the fins of the longitudinal vortex generator 28 are made out of the same material as the hat. Other suitable material such as alloy steel, aluminum alloy, or carbon-ceramic etc., may be used to produce brake rotor 23, the hat 233 and the fins of the longitudinal vortex generator 28 as well.

During vehicle braking, the heat generated by friction at the frictional contact band 27 is absorbed by the mass of the brake rotor 23 and the brake pad 26. Temperature differences are developed from frictional contact band 27 toward the inside body of the brake rotor, with temperatures at frictional contact bands remain the highest among all surfaces of the brake rotor.

On the inboard side of the brake rotor 23, the cooling air flows in the gap between the brake rotor 23 and the protective plate 24. The cooling air flows pass the tips of the fins of the longitudinal vortex generator 29, generating longitudinal vortices in the air flows that travel along the frictional contact bands 27 on the inboard side of the brake rotor 23.

On the outboard side of the brake rotor 23, cooling air passes the tips of certain fins of the longitudinal vortex generator 28, for example, as shown in the FIG. 2B, the fin 281, 282 and 283 which rotates to the highest position at the hat 233 and the fin 284, 285 and 286 which rotates to the lowest position at the hat 233, creating longitudinal vortices in the downstream air flows that travel across the frictional contact bands 27 on the outboard side of the brake rotor 23.

Longitudinal vortex enhances convective heat transfer in the following way: reducing boundary layer thickness, flow destabilization, and growing the temperature gradient near the heat transfer surface.

From microscale, as air passes fins of the longitudinal vortex generator, strong secondary swirling flow is generated, and the tangential velocity of the vortices can be higher than the main flow velocity. The high-velocity swirling secondary flow can not only promote mixing of the cooling air in the proximity of the frictional contact band 27, but also inject the high-energy flow into the boundary layer established between the cooling air and the frictional contact bands 27, to suppress and delay the boundary layer separation, which decrease profile drag.

As a result, the longitudinal vortex generator 28 and 29 promote substantially convective heat transfer between the brake rotor 23 and surrounding cooling air flows, accelerating the heat dissipation from the brake rotor 23 and the brake pad 26, reducing the operating temperatures on the frictional contact band 27, while introducing only mild drag to the vehicle and adding limited mass to the disc brake unit.

The introduction of those longitudinal vortex generators improves the air cooling along the frictional contact bands 27 and improve the performance of said disc brake unit.

Figure 3C:
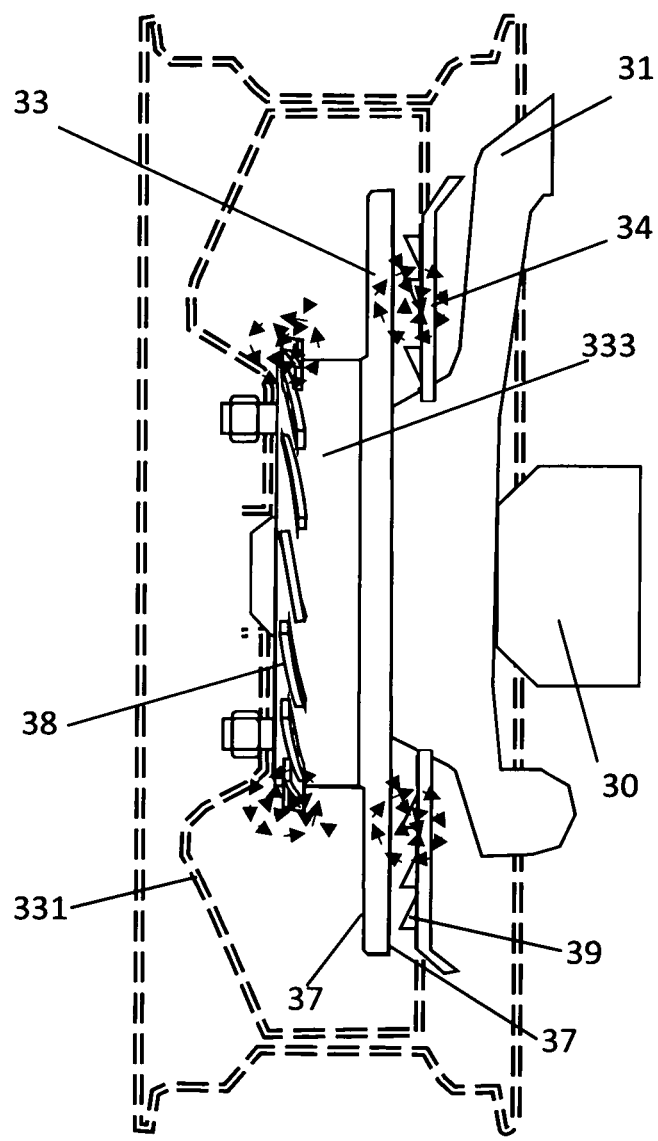
FIG. 3C is a partial perspective view of the road vehicle disc brake unit shown in FIG. 3, once its brake caliper and brake pad are removed, also included are schematic views of swirling secondary cooling air flows, represented by arrows icons, induced by the longitudinal vortex generators.

FIG. 3, FIG. 3A and FIG. 3C depict an alternative embodiment of the present invention to the one presented in FIG. 2. Taking the fin 391, 392, 393, and 394 as examples, they are pressed out of the protective plate 34, with the aid of die and tool. The partially punched out triangular sections are bent 90 degrees towards the backside of the protective plate 34. The resulting fins in the form of triangular ribs 391, 392, 393, and 394 are perpendicular to the protective plate 34 and takes an acute angle of 39A against the primary cooling air flow direction represented by the arrow icon at the extreme right.

Figure 4C:
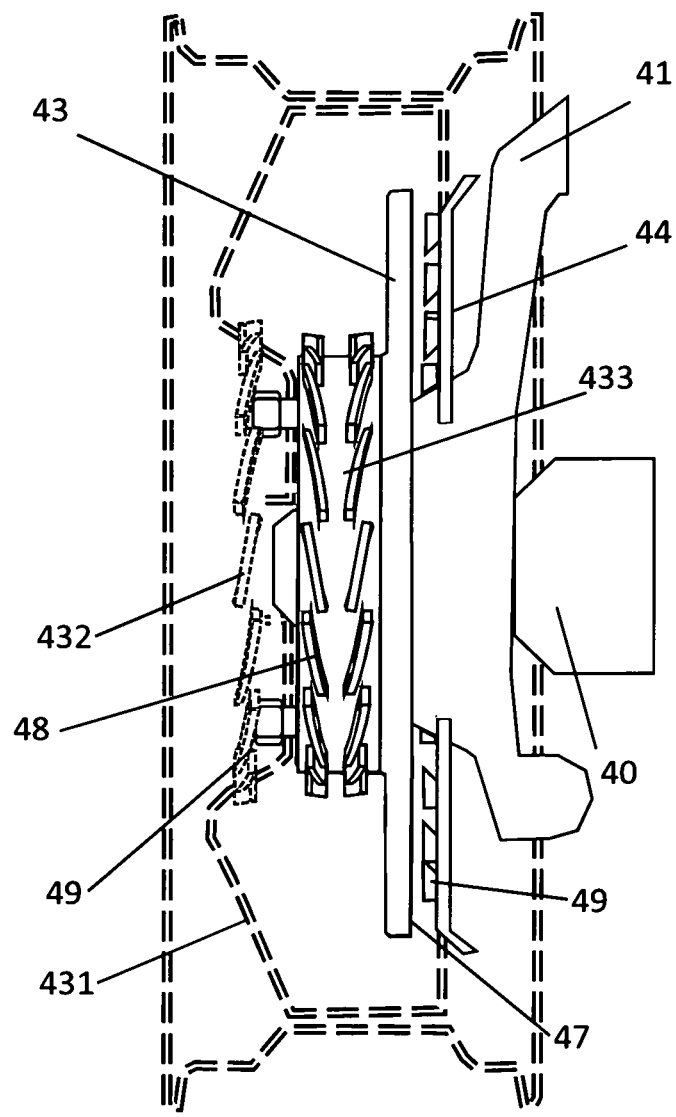
FIG. 4C is a partial perspective view of a road vehicle disc brake unit to which longitudinal vortex generators are mounted to not only hat of the brake rotor and protective plate, but also neighbouring wheel rim, according to alternative embodiment of the present invention.

FIG. 4C depicts another alternative embodiment of the present invention to the one presented in FIG. 2 or FIG. 3. The longitudinal vortex generator 48 has two rows of fins mounted to the hat 433 of the brake rotor 43 which is coupled to the axle 40. Additional longitudinal vortex generator 432 is mounted to inner face of the wheel rim 431 and it can be die casted at the same time when the wheel rim in aluminum alloys is manufactured.

Figure 5A:
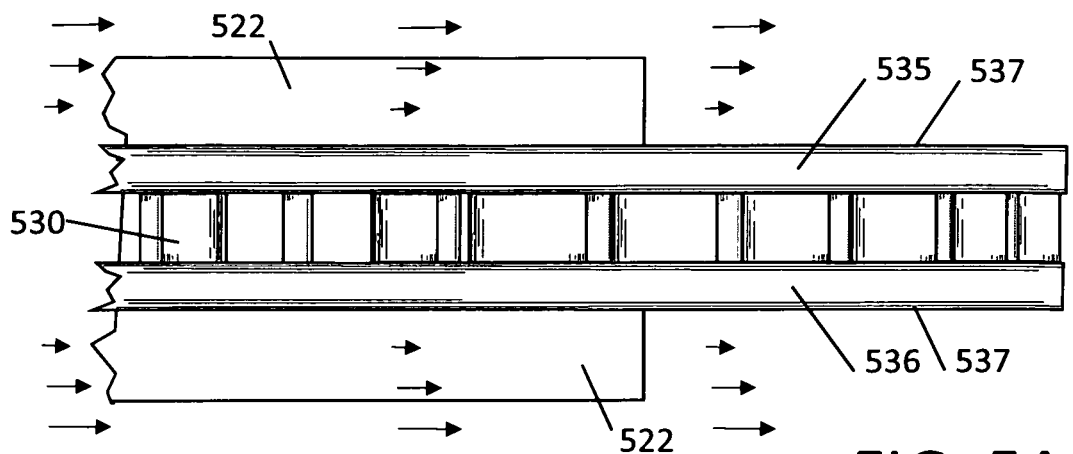
FIG. 5A is a partial top view of the conventional railway vehicle ventilated brake disc shown in FIG. 5.
Figure 5:
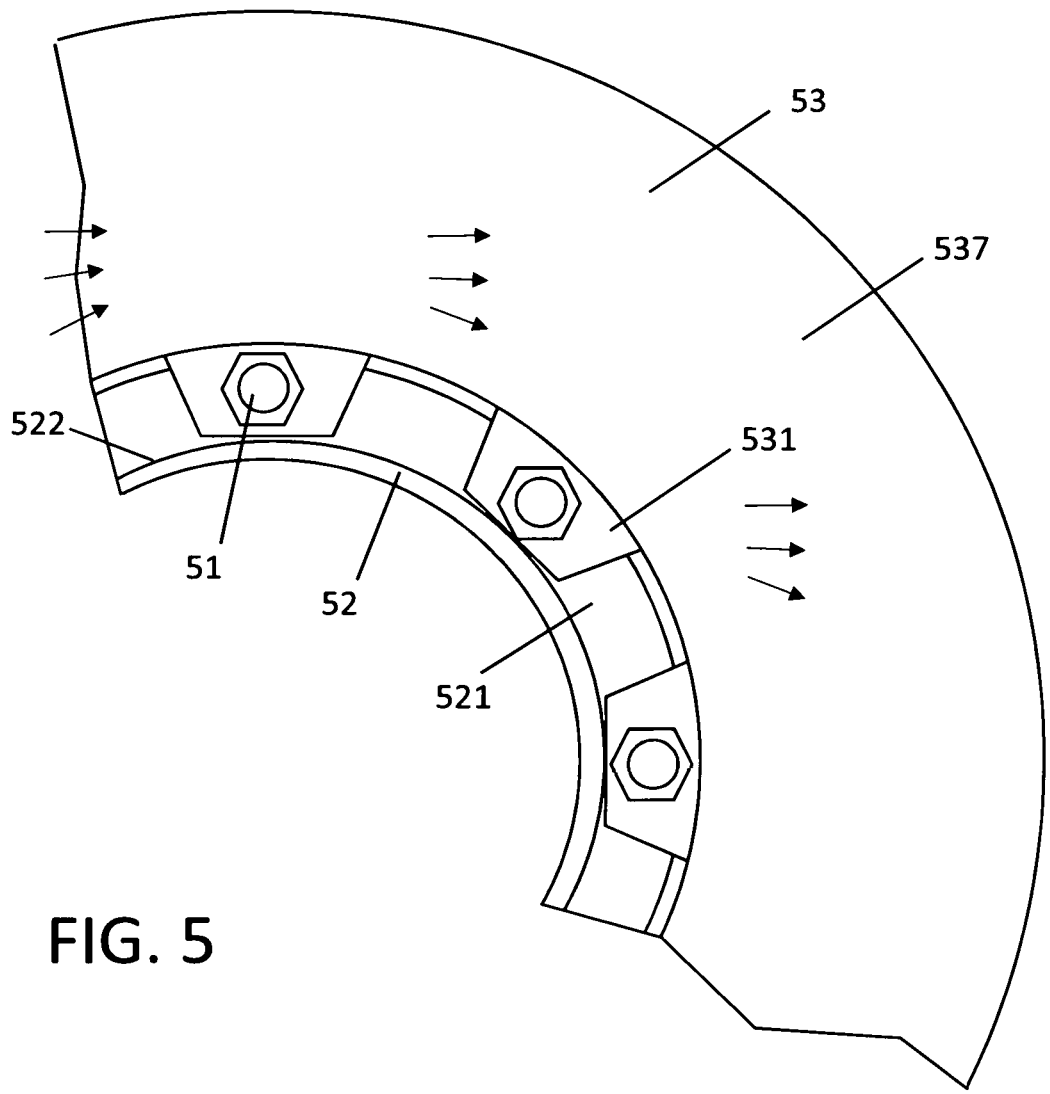
FIG. 5 is a partial side view of a conventional railway vehicle ventilated brake disc mounted to a hub, also included are schematic views of primary cooling air flows, represented by arrows icons.

FIG. 5 and FIG. 5A show two components of a conventional railway vehicle disc brake unit, a ventilated brake rotor 53 and a hub 52. They are coupled to an axle of the railway vehicle (not shown). The hat 531 in the form of a plurality of teeth extends inwardly and is coupled to the annular wing 521 of the hub 52 with the help of a plurality of fastening members 51. Both hub 52 and brake rotor 53 are rotatable components of the vehicle.

The cylindrical hub 52 defines a central axis and an outer diameter which in turns defines an outer hub periphery 522. The ventilated brake rotor 53 has two opposed annular friction rings 535 and 536, each having an outer surface and inner surface. Two annular friction rings are connected to each other by a plurality of vanes 530 extending from the inner surface of one friction ring to the inner surface of the other friction ring.

During railway vehicle braking, the non-rotatable brake pad of a caliper (not shown) presses against rotatable brake rotor 53 to exert a friction force to decelerate and stop the vehicle, thereby defining a pair of frictional contact bands 537 on the outer surfaces of the brake rotor 53 that are engaged with the non-rotatable brake pad of a caliper (not shown). The friction heat produced at the frictional contact band 537 is partly dissipated to the atmosphere by convective air cooling and partially transferred to the body and inner surface of the two friction rings 535 and 536 by thermal conduction. Among all the surfaces of the brake rotor 53, the temperature at the frictional contact bands 537 remain the highest during the vehicle braking.

Arrow icons in FIG. 5 and FIG. 5A give schematic views of primary air flows passing across the frictional contact bands 537. Those air flows travel generally in parallel to the frictional contact bands 537, and at lower speed in proximity to the frictional contact bands 537 than the zone at a distance from the brake rotor 53.

FIG. 6, FIG. 6A, FIG. 6B, FIG. 6C and FIG. 6D depict one embodiment of the present invention. In addition to a hub 62, a ventilated brake rotor 63 as well as outer hub periphery 622 and frictional contact band 637, identical to the hub 52, the brake rotor 53, the corresponding outer hub periphery 522 and the frictional contact band 537 shown in FIG. 5, a pair of longitudinal vortex generator rings 68 and 69 are provided.

The longitudinal vortex generator ring, taking the ring 68 as an example, is composed of a circular band 684 and a plurality of fins, for example 681, 682 and 683, evenly distributed to the outer surface of the circular band 684. Each fin extends within a reference plane 688 represented in dash line that takes an acute angle 68A of less than 45 degrees relative to radial plane 689 represented by another dash line which is perpendicular to the axis of the circular band 684. The ring 68 is made by casting, forging, injection molding or fabricated by stamping and welding or any other suitable manufacturing method. The ring 68 and 69 can be made of any suitable heat resistant material including but not limited to cast iron, steel alloys, aluminum alloys, or heat resistant non metallic material or composite material. The band 684 and the fin 681, for example, can be made out of the same material or be made out of different material as separate components that are joined or connected to each other later on.

Figure 6A:
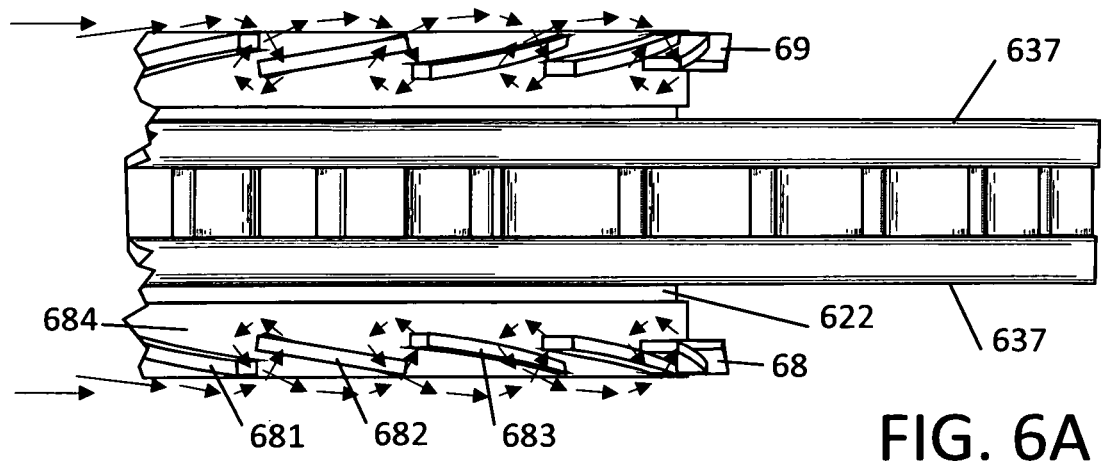
FIG. 6A is a partial top view of the embodiment of the present invention shown in FIG. 6, also included are schematic views of swirling secondary cooling air flows, represented by arrows icons, induced by the longitudinal vortex generators.
Figure 6:
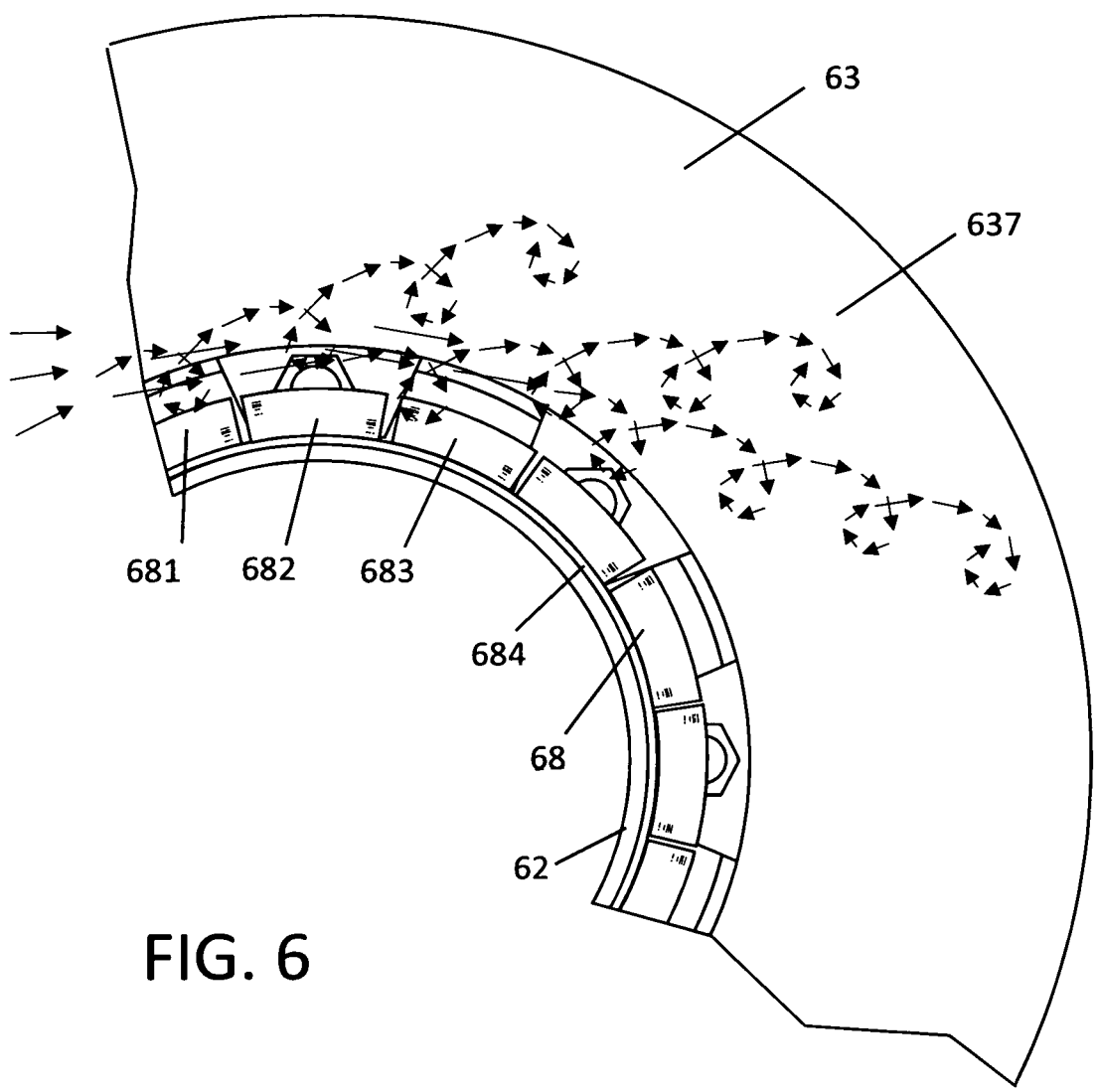
FIG. 6 is a partial side view of a railway vehicle ventilated brake rotor mounted to a hub to which a pair of longitudinal vortex generator rings is disposed on the cylindrical surfaces of the hub according to an embodiment of the present invention, also included are schematic views of swirling secondary cooling air flows, represented by arrows icons, induced by the longitudinal vortex generators.
Figure 6D:
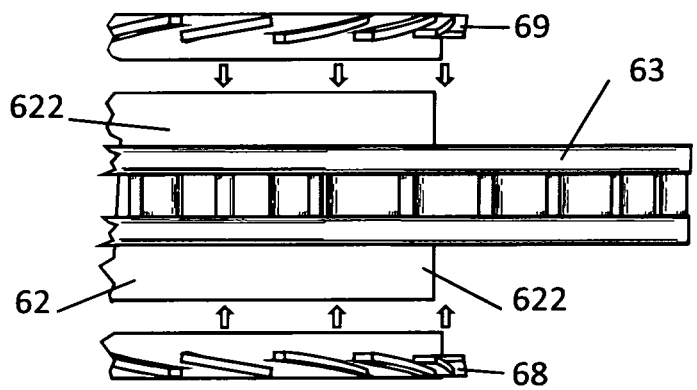
FIG. 6D is a schematic illustration showing a pair of longitudinal vortex generator rings is mounted to two sides of the hub shown in FIG. 6.
Figure 6C:
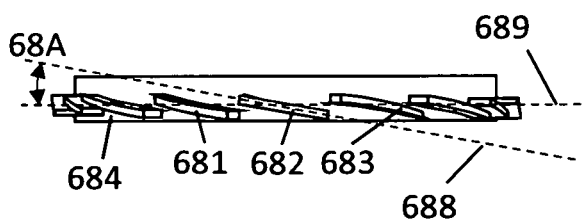
FIG. 6C is a top view of the longitudinal vortex generator ring shown in FIG. 6B.
Figure 6B:
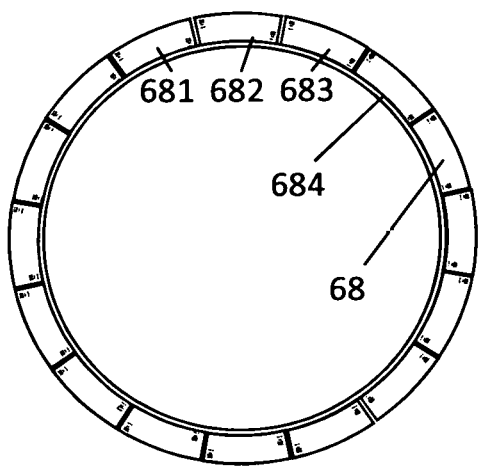
FIG. 6B is a side view of the longitudinal vortex generator ring in which a longitudinal vortex generator is mounted to a standalone circular band.

As shown by the FIG. 6D, the ring 68 and 69 are mounted to the outer periphery 622 of the hub 62 by interference fit or shrink id.

During railway vehicle braking, the rotatable brake rotor 63 is engaged with a pair of non-rotatable brake pads of a caliper (not shown) to decelerate and stop the vehicle. The friction heat produced at frictional contact band 637 is partially dissipated with the help of the passing air flows surrounding the vehicle. The cooling air passes the tips of certain fins of the longitudinal vortex generator ring 68 and 69, for example as shown in the FIG. 6 and FIG. 6A, the fin 681, 682 and 683 which rotates to the highest position at the hub 62, as well as other fins (not shown) which rotates to the lowest position at the hub 62, creating longitudinal vortices in the air flows that travel across part of frictional contact bands 637.

Longitudinal vortex enhances convective heat transfer in the following way: reducing boundary layer thickness, flow destabilization, and growing the temperature gradient near the heat transfer surface.

From microscale, as air passes fins of the longitudinal vortex generator ring 68 and 69, strong secondary swirling flow is generated, and the tangential velocity of the vortices can be higher than the main flow velocity. The high-velocity swirling secondary flow can not only promote mixing of the cooling air in the proximity of the frictional contact band 637, but also inject the high-energy flow into the boundary layer established between the cooling air and the frictional contact bands 637, to suppress and delay the boundary layer separation, which decrease profile drag.

As a result, the longitudinal vortex generator 68 and 69 promote substantially convective heat transfer between the brake rotor 63 and passing cooling air, accelerating the heat dissipation from the brake rotor 63, reducing the operating temperatures on the frictional contact band 637, while introducing only mild drag and adding limited mass to the railway vehicle.

The introduction of those longitudinal vortex generator rings improves the convective air cooling along the frictional contact bands 637 and improve the performance of said disc brake unit.

Figure 7:
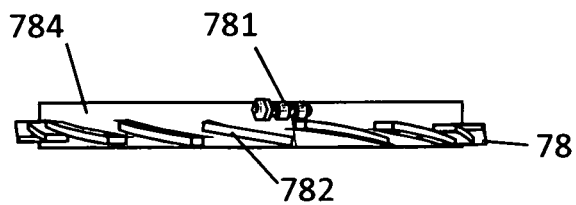
FIG. 7 is a top view of an alternative embodiment of the longitudinal vortex generator ring presented in FIG. 6B.

In FIG. 7, an alternative arrangement of the longitudinal vortex generator ring 78 is provided. The ring 78 comprises a band 784 of a split clamp ring type, a set of fastening device 781 and a plurality of fins 782 being mounted to the band 784. The two ends of the split band 784 can be joined together with the help of the fastening device 781. The band 784 is made of any suitable material, including but not limited to spring steel SAE5160. Instead of press fit or shrink fit to a hub, the ring 78 can be mounted by wrapping around the hub and securing to it by the set of fastening device 781.

Figure 8A:
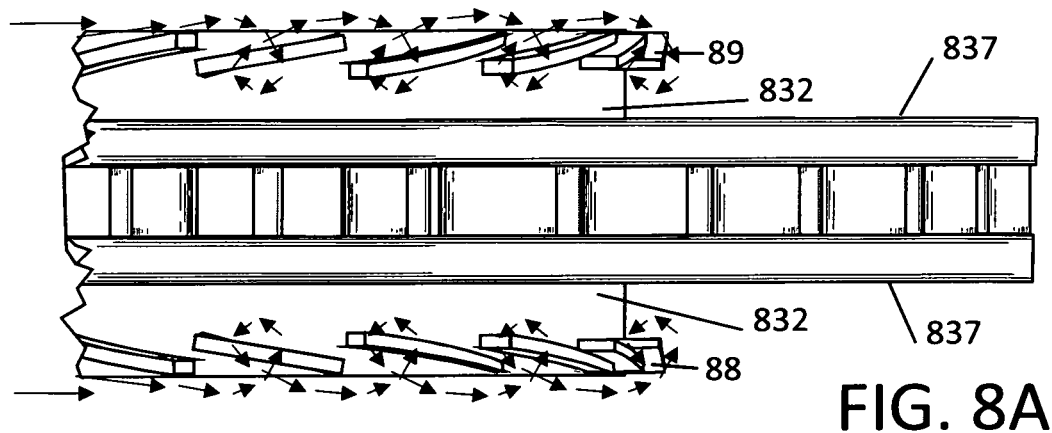
FIG. 8A is a partial top view of the embodiment of the present invention shown in FIG. 8, also included are schematic views of swirling secondary cooling air flows, represented by arrows icons, induced by the longitudinal vortex generator.
Figure 8:
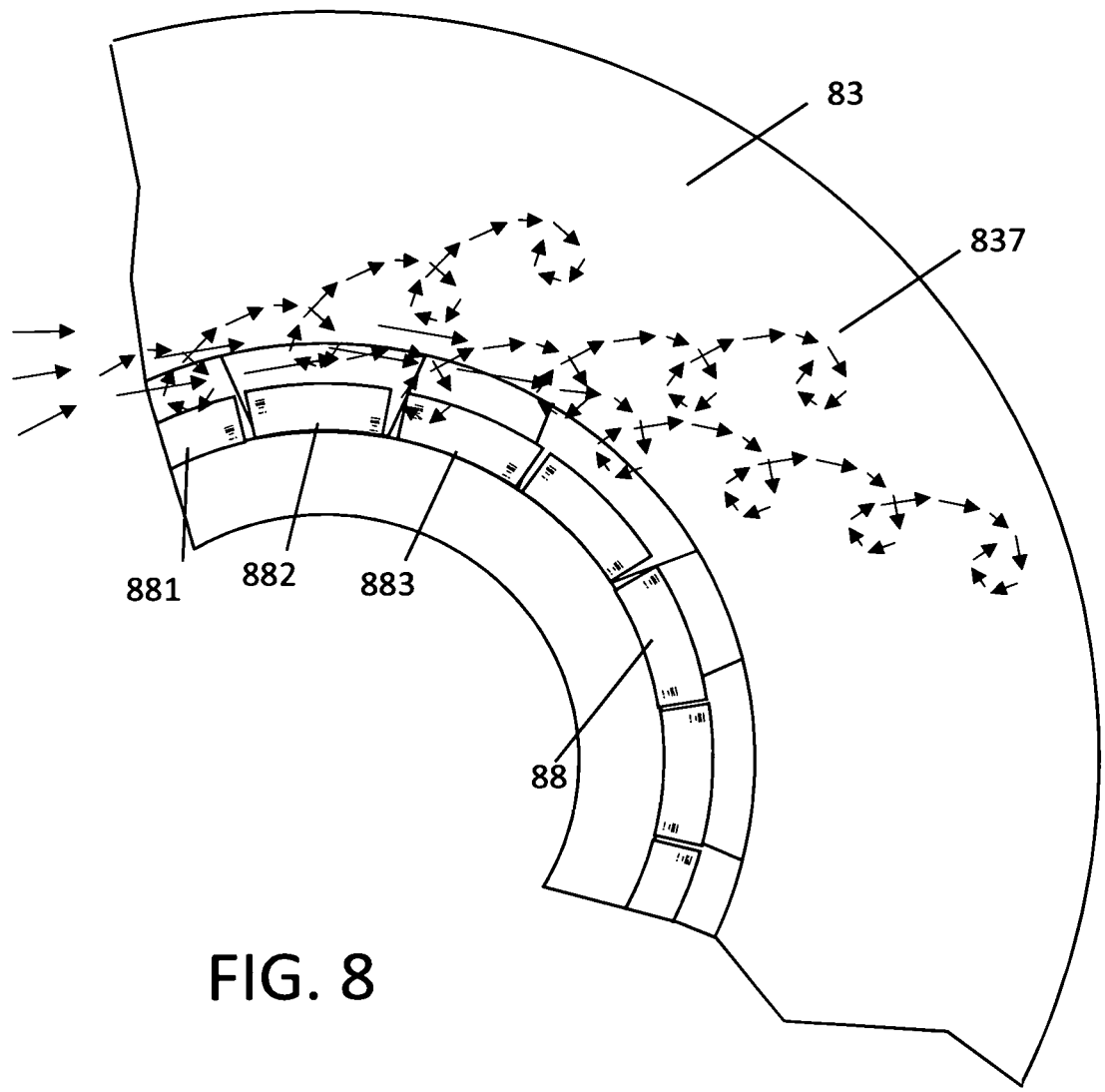
FIG. 8 is a partial side view of a railway vehicle ventilated brake rotor with integrated hub to which a pair of longitudinal vortex generator is built directly to the brake rotor hub section according to an alternative embodiment of the present invention, also included are schematic views of swirling secondary cooling air flows, represented by arrows icons, induced by the longitudinal vortex generators.

FIG. 8 and FIG. 8A provides another alternative arrangement to the embodiment of present invention presented by FIG. 6. The brake rotor 83 is a type of integrated brake rotor and hub for directly mounting to an axle of a railway vehicle. The longitudinal vortex generator 88 and 89 which are composed of a plurality of fins, taking the fin 881, 882 and 883 of the longitudinal vortex generator 88 for example, are mounted to the outer periphery 832 of the hub section of the brake rotor 83 by casting or forging or other suitable manufacturing method and is made of the same material as the brake rotor 83, for example, vermicular graphite cast iron or spheroidal graphite cast iron, cast steel alloys or carbon-ceramic etc.

It should be noted that other embodiments of the present invention different from the ones shown in attached figures are possible, for example, The longitudinal vortex generators can be integrated into a disc brake unit using either solid or ventilated brake rotor, mounted to a railway axle or a railway wheel of a railway vehicle including freight rail cars, passenger coaches, locomotives, electric multiple units train (EMU), diesel multiple units train (DMU) etc.

Embodiment of the longitudinal vortex generator mounted to a protective plate of a road vehicle can be applied to a railway vehicle by disposing protective plate and longitudinal vortex generator to each side of the brake rotor. Furthermore, the protective plate can be actuated by a moving mechanism and have two positions, a deployed position at which the protective plate and mounted longitudinal vortex generator are placed upstream of the cooling air flows that later on travel across the frictional contact band, a hidden position at which the protective plate is withdrawn to inside of the railway vehicle body without introducing any drag.

The longitudinal vortex generators can be mounted to two different sections of an integrated wheel hub and brake rotor of a road vehicle, for example, one longitudinal vortex generator is mounted to the hat section on the outboard side and another longitudinal vortex generator is mounted to the hub section on the inboard side.

The present invention has been described in connection with the preferred embodiments of the various figures. It is to be understood that other similar embodiments may be used, or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A disc brake unit for a vehicle, the disc brake unit comprising:
(a) a vehicle axle;
(b) a wheel, a hub and a brake rotor that are rotatable, the hub being coupled to the vehicle axle, the wheel being coupled to the hub, the brake rotor further comprising an annular friction ring and a hat, the hat outwardly connecting to the annular friction ring and inwardly being coupled to the vehicle axle;
(c) a friction member that is non-rotatable, being in frictional contact with the annular friction ring during the vehicle braking, thereby defining an annular frictional contact band on the surface of the friction ring;
(d) a vortex generating device that is disposed on the wheel, the hub or the hat, for generating longitudinal vortex in the cooling air flow that passes across at least part of the frictional contact band, the longitudinal vortex having a rotating axis substantially parallel to the primary downstream air flow direction.

2. The disc brake unit according to claim 1, wherein said vortex generating device is a plurality of fins distributed on the surface of the wheel, the hub or the hat, each fin expands in a plane that takes an acute angle of less than 45 degrees relative to the radial plane that is perpendicular to the axis of said vehicle axle.

3. The disc brake unit according to claim 2, wherein said fins are made by casting out of the same material as said wheel, said hub or said hat.

4. The disc brake unit according to claim 2, wherein said fins are formed on a ring that is coupled to said wheel, said hub or said hat.

5. The disc brake unit according to claim 2, wherein said vehicle is a railway vehicle equipped with an axle mounted brake rotor, the friction member is a brake pad, said fins are disposed on the surface of the hub.

6. The disc brake unit according to claim 2, wherein said vehicle is a railway vehicle equipped with a wheel mounted brake rotor, the friction member is a brake pad, said fins are disposed in the hub section of the wheel.

7. The disc brake unit according to claim 2, wherein said vehicle is a road vehicle, said friction member is a brake pad, said fins are disposed on the surface of the hat.

8. The disc brake unit according to claim 2, wherein said vehicle is a road vehicle, said friction member is a brake pad, said fins are disposed on the surface of the wheel.

9. The disc brake unit according to claim 7 has a friction member support and a protective plate,
the friction member support being secured to the vehicle, the friction member support structurally supporting the brake rotor at one end and the friction member at another end;

the protective plate being coupled to the friction member support and being substantially parallel to the friction ring, and covering at least part of the frictional contact band, said fins are disposed on the surface of the hat and the protective plate.

10. The disc brake unit according to claim 1, wherein said vehicle axle is rotatable, said vortex generating device is disposed on the surface of the vehicle axle, the wheel, the hub or the hat.

11. The disc brake unit according to claim 10, wherein said fins are formed on a ring that is coupled to said vehicle axle, said wheel, said hub or said hat.

12. A disc brake unit for a vehicle, the disc brake unit comprising:
(a) a vehicle axle;
(b) a wheel, a hub and a brake rotor that are rotatable the hub being coupled to the vehicle axle, the wheel being coupled to the hub,
the brake rotor further comprising an annular friction ring and a hat, the hat outwardly connecting to the annular friction ring and inwardly being coupled to the vehicle axle
(c) a friction member and a friction member support that are non-rotatable,
the friction member being in frictional contact with the annular friction ring during the vehicle braking, thereby defining an annular frictional contact band on the surface of the friction ring,
the friction member support being secured to the vehicle, the friction member support structurally supporting the, brake rotor at one end and the friction member at another end;
(d) a vortex generating device, with a plurality of fins, is disposed on the surface of the friction member or the friction member support, for generating longitudinal vortex in the cooling air flow that passes across at least part of the frictional contact band, the longitudinal vortex having a rotating axis substantially parallel to the primary downstream air flow direction, each said fin takes an acute angle of less than 85 degree relative to primary flow direction of the cooling air.

13. The disc brake unit, according to claim 12, has a protective plate that is non-rotatable, the protective plate being coupled to the friction member support and being substantially parallel to the friction ring, the protective plate covering at least part of the frictional contact band, said vortex generating device, with a plurality of fins, is disposed on the surface of the friction member, the friction member support or the protective plate, each fin takes an acute angle of less than 85 degree relative to primary flow direction of the cooling air.

14. The disc brake unit according to claim 13, wherein said fins are made of the same material as the non-rotatable friction member, the friction member support or the protective plate.

15. The disc brake unit according to claim 13, wherein said fins are disposed on the protective plate and the fins are formed by stamping.

16. The disc brake unit according to claim 13, wherein the protective plate is movable by a driving mechanism between a deployed position at which the longitudinal vortex generating device is in contact with the cooling air flow before said cooling air flow passes across at least part of the frictional contact band, and a hidden position at which longitudinal vortex generator separates from said cooling air flow.

* * * * *